(12) United States Patent
van den Berg

(10) Patent No.: US 6,941,891 B2
(45) Date of Patent: Sep. 13, 2005

(54) FEED METERING DEVICE

(75) Inventor: Karel van den Berg, Bleskensgraaf (NL)

(73) Assignee: Lely Research Hold A.G., Zug (CH)

( * ) Notice: Subject to any disclaimer, the term of this patent is extended or adjusted under 35 U.S.C. 154(b) by 0 days.

(21) Appl. No.: 10/718,705

(22) Filed: Nov. 24, 2003

(65) Prior Publication Data
US 2004/0103848 A1 Jun. 3, 2004

Related U.S. Application Data

(62) Division of application No. 09/828,911, filed on Apr. 10, 2001, now Pat. No. 6,651,584.

(30) Foreign Application Priority Data

Apr. 10, 2000 (NL) .............................. 1014896

(51) Int. Cl.⁷ .................................. A01K 5/02
(52) U.S. Cl. .................................... 119/51.02
(58) Field of Search ............................. 119/51.02, 57.1, 119/57.92, 56.1

(56) References Cited

U.S. PATENT DOCUMENTS

| | | | | |
|---|---|---|---|---|
| 3,826,231 A | * | 7/1974 | Crawford et al. | 119/51.12 |
| 4,475,481 A | * | 10/1984 | Carroll | 119/51.02 |
| 4,617,874 A | * | 10/1986 | Zammarano | 119/51.12 |
| 4,934,317 A | * | 6/1990 | Pourshalchi | 119/165 |
| 5,150,664 A | * | 9/1992 | Kirk | 119/51.12 |
| 5,377,620 A | * | 1/1995 | Phillippi | 119/51.12 |
| 5,570,655 A | * | 11/1996 | Targa | 119/51.02 |
| 5,669,328 A | * | 9/1997 | Lanfranchi | 119/57.92 |
| 6,044,795 A | * | 4/2000 | Matsuura et al. | 119/51.02 |
| 6,349,671 B1 | * | 2/2002 | Lewis et al. | 119/51.02 |
| 6,371,047 B1 | * | 4/2002 | van den Berg | 119/51.02 |

* cited by examiner

Primary Examiner—Teri Pham Luu
Assistant Examiner—Kimberly S. Smith
(74) Attorney, Agent, or Firm—Penrose Lucas Albright

(57) ABSTRACT

A feed metering device for distributing fodder and/or drink in metered portions to an animal. The feed metering device is provided with a feed unit for containing fodder and/or drink, an entrance opening to the feed unit, and a feed supplying device for supplying an amount of fodder and/or drink to the feed unit. The feed metering device is provided with a closing means that is movable across the entrance opening in order to deter an animal visiting the feed unit from taking fodder and/or drink. The closing means rotates about an axis, the closing means being driven by a roll that contacts the closing means, which roll is driven by a motor.

9 Claims, 5 Drawing Sheets

FEED METERING DEVICE

RELATED APPLICATION

This Application is a division of application Ser. No. 09/828,911, filed Apr. 10, 2001, which issued as U.S. Pat. No. 6,651,584, Nov. 25, 2003.

FIELD OF THE INVENTION

The present invention relates to a feed metering device for distributing fodder or drink, or both, in metered portions to an animal. Such a feed unit may include a manger or feeding trough or both, or a unit provided with a nipple such as may be provided for calves.

BACKGROUND OF THE INVENTION

Such a feed metering device is known from European Patent Application EP-A0610171, of Vogl, published Aug. 10, 1995. By means of a control unit the closing means of this known feed metering device is actively retained in the position in which it closes the manger or feeding trough.

SUMMARY OF THE INVENTION

It is one of the objectives of the present invention to provide an alternative feed metering device for distributing fodder or drink, or both, in metered portions to an animal, which device, on the one hand, deters in a constructively simple efficient and inexpensive manner animals that are not eligible for being fed from putting their heads into the feed unit, and, on the other hand, offers additional advantages.

For this purpose, in accordance with the invention, a metering device of the above described type is characterized by the closing means rotating about an axis, such rotation being driven by a roll in contact with the closing means which roll is driven by a motor.

The feed metering device preferably includes animal identification device, the roll being controlled with the aid of data from the animal identification device.

In an embodiment of a feed metering device according to the invention, a compact construction is provided when the roll is located below the entrance opening. Preferably a housing in which the roll is mounted is disposed at such location.

The closing means may be formed by a separate component, but is preferably constituted by the feed unit itself, which is designed as a movable one. As a result the number of components is limited and the feed metering device can be manufactured economically.

In order to prevent fodder or drink, or both, from falling from the feed unit in certain positions of the feed unit, the latter comprises a wall portion for catching fodder or drink, or both, remaining in the feed unit. Said wall portion can also act as a feed guide means for fodder or drink or both that is supplied by the feed supplying device to the feed unit.

An enduring and firm construction is provided when the feed unit bears on the housing via the roll.

The motor is preferably included in such housing, so that a compact construction is obtained. The housing also serves to protect the motor against contamination, damage and the like.

A quick and accurate identification of animals is obtained when the animal identification device is included in the housing, the animal identification device then also being guarded against contamination, damage and the like.

The feed metering device preferably comprises further deterring means for deterring an animal, which include a loudspeaker for producing an animal-frightening sound. Certain animals have appeared to be highly sensitive to certain sounds, so that a loudspeaker is appropriate for deterring such animals. Moreover, such a loudspeaker may be used for producing calming or stimulating sounds when an animal uses the feed metering device correctly.

Alternatively or additionally, the further deterring means may include means for generating an animal-frightening light. In particular when a plurality of feed metering devices are disposed side by side, the use of a frightening light is desirable, as this light can be directed in such a manner that its effect is limited to one particular feed metering device.

A further deterring means may include a voltage emitting device for emitting an animal-frightening electric voltage. Sound and light have proved to be effective for deterring unwanted animals, but have the disadvantage of being sometimes discernible at a greater distance than necessary and for their purposes from the relevant feed metering device. Animals that undesirably visit a feed metering device often make contact with the feed metering device, usually with their noses. By linking the components likely to be touched the animals with a voltage emitting device it is possible to deter undesired animals. Alternatively, a forced air flow may be used for deterring the animal.

A preferred embodiment of a feed metering device according to the invention is characterized in that the feed metering device is provided with means for weighing the fodder or drink, or both, present in the feed unit, which weighing means relates to improvement of the feed unit in a pivoting, rotating manner. Thus it is possible to determine how much fodder or drink, or both, is consumed by a particular animal. On the basis thereof the amount of fodder or drink, or both, consumed by an animal can be determined over the course of time whereupon the health condition of an animal can be deduced; for, when an animal unexpectedly consumes smaller amounts of fodder or drink, or both, this may be a sign that the animal is ill. Moreover, it is undesirable when an animal leaves a certain amount of fodder or drink, or both, that such left-over fodder or drink, or both, supplied to the next animal at the feed unit is not taken into account. The means for weighing the fodder or drink, or both, present is the feed unit is thus preferably linked with the feed supplying device for supplying an amount of fodder or drink, or both, to the relevant feed unit with the aid of data both from the animal identification device and the weighing means.

The means for weighing the fodder or drink, or both, present in the feed unit may comprise a feed unit which is pivotable about a hinge pin, the degree of pivoting being determined by the weight of the fodder or drink present in the feed unit, and a device for determining the degree of pivoting, that is the angular movement of the feed unit and for deducing, from the degree as determined, the weight of the fodder or drink, or both, present in the feed unit. The degree of pivoting of the feed unit depends on the amount of fodder or drink, or both, in the feed unit. The more fodder or drink, or both, the greater the degree of pivoting. The exact correlation between the degree of pivoting and the amount of fodder or drink, or both, can previously have been determined by means of simple calibration tests.

A compact construction of the feed metering device is obtained when the device for determining the degree of pivoting of the feed unit and for deducing from such degree of angular displacement, the weight of the amount of fodder or drink, or both, present in the feed unit, is integrated in the animal identification device.

When the device for deterring the degree of pivoting of the feed unit and for deducing, from the degree as so determined, the weight of the amount of fodder or drink, or both, present in the feed unit comprises a measuring roll which is in contact with the feed unit, it is possible to determine from the degree of rotation of the roll, the degree of pivoting and thus the amount of fodder or drink, or both, which is in the feed unit.

Alternatively or additionally, the device for determining the degree of pivoting of the feed unit and for deducing, from the degree as so determined, the weight of the amount of fodder or drink, or both, present in the feed unit, may comprise a load sensor, the feed unit bearing on the load sensor. The load sensor is preferably included in the animal identification device.

In order to be able to measure even a small difference in weight, in a preferred embodiment of a feed metering device according to the invention, the hinge pin and the load sensor and the measuring roll, respectively, are located so as to be closely proximate each other.

In order to prevent for example the load sensor from being damaged in the undesired event of a defect, there is provided a safety supporting bracket from the feed unit.

A preferred embodiment of a feed metering device according to the invention is characterized in that the means for weighing the fodder or drink, or both, present in the feed unit comprises a movable feed unit, a motor for moving the feed unit, a device for measuring the magnitude of the torque during movement, and for deducing, from the magnitude of the torque measured, the weight of the fodder or drink, or both, present in the feed unit. The magnitude of the torque generated by the movement of the feed unit depends on the amount of fodder or drink, or both, in feed unit. Also in this situation, the exact correlation between torque and amount of fodder or drink, or both, in the feed unit can previously be determined by means of simple calibration tests.

A compact feed metering device is obtained when the motor for moving the feed unit and the device for measuring the magnitude of the torque during movement and for deducing, from the magnitude of the torque measured, the weight of the fodder or drink, or both, present in the feed unit, are integrated with the animal identification device.

A mechanically simple but accurate construction is obtained when the motor for moving the feed unit drives a torque roll, said torque roll being in contact with the feed unit.

According to the invention, the means for deterring an unwanted animal and the means for measuring the amount of fodder or drink, or both, in the feed unit can be combined in one means, in that the roll for driving the feed unit as a closing means and as the torque roll used for measuring the torque are the same roll.

In order to be able accurately to perform animal identification and to obtain at the same time a compact construction, a feed metering unit according to the present invention is characterized in that the animal identification device is disposed in a location below the entrance opening, including the vicinity thereof.

BRIEF DESCRIPTION OF THE DRAWINGS

The invention will be explained hereinafter in ether detail with reference, by way of example, to the drawings in which.

DETAILED DESCRIPTION OF THE PREFERRED EMBODIMENTS

Figure 1:
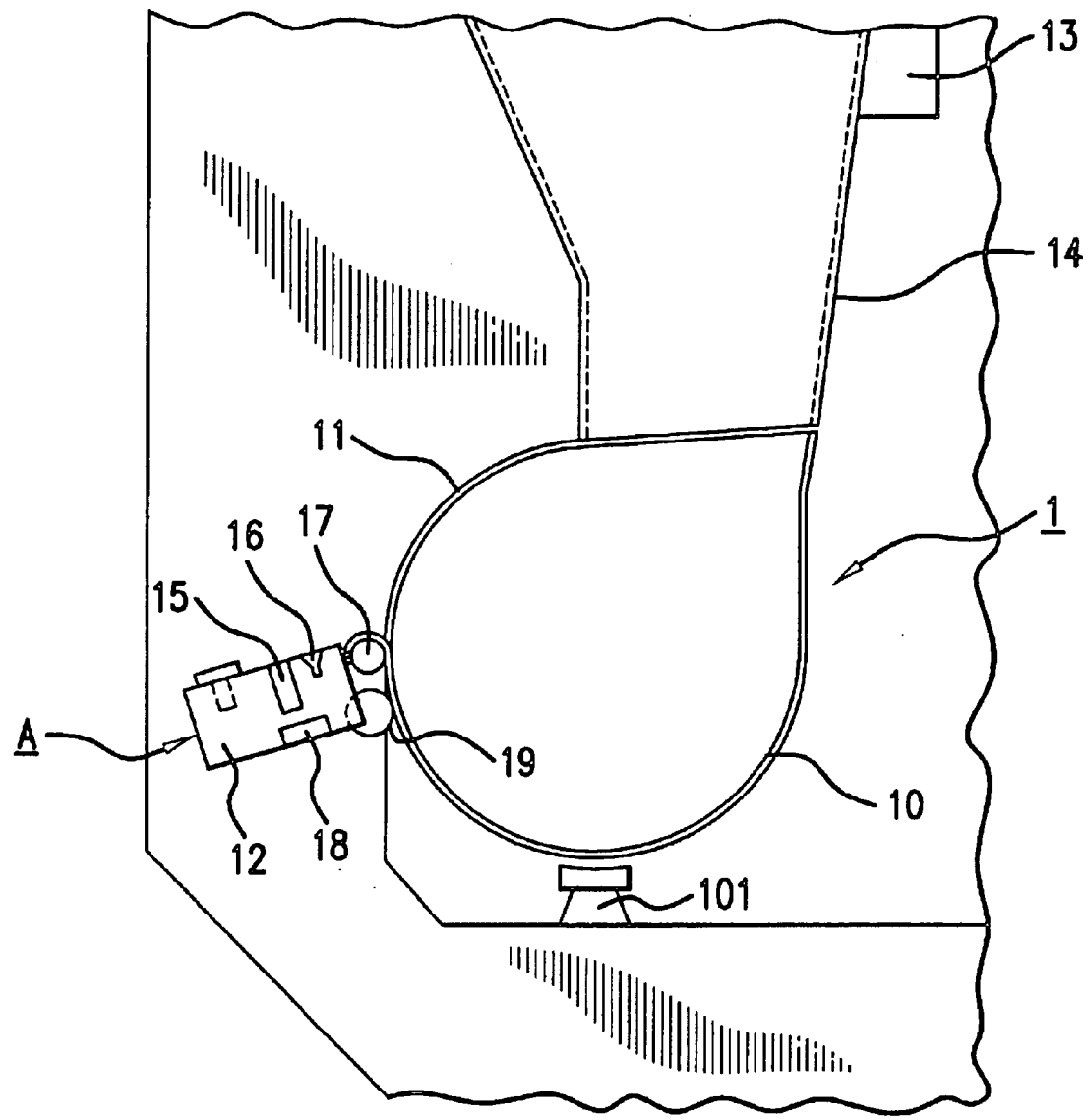
FIG. 1 is a side elevational view of a first embodiment of a feed metering device according to the invention.

FIG. 1 shows schematically a first embodiment of a feeding metering device 1 according to the invention. Feed metering device 1 distributes fodder or drink, or both, which for the sake of simplicity will hereinafter be denoted as "feed", by which is meant fodder or drink, or both, in metered portions to an animal, and is provided with a feed unit 10, also called a manger or feeding trough, for containing feed. An entrance opening 11 makes feed unit 10 accessible to an animal, for example but not exclusively, a cow. An animal identification device 12, known per se, recognizes a particular animal that approaches the feed unit 10 and wishes to use it. The animal identification device 12 is preferably disposed in feed metering device 1, but may alternatively also be disposed at a distance therefrom. A feed supplying device 13 supplies an amount of feed to the feed unit 10, possibly with the aid of data from the animal identification device 12, feed from a non-shown feed stock entering the feed unit 10 via a valve provided for such purpose and a chute 14.

Thus it is possible for the feed metering device 1 to recognize a particular cow by means of a transponder fitted to or on the cow. Feed supplying device 13 is controlled in a manner well known in the art which is controlled by software that ensures that the right amount of feed is distributed to the relevant cow.

Figure 2:
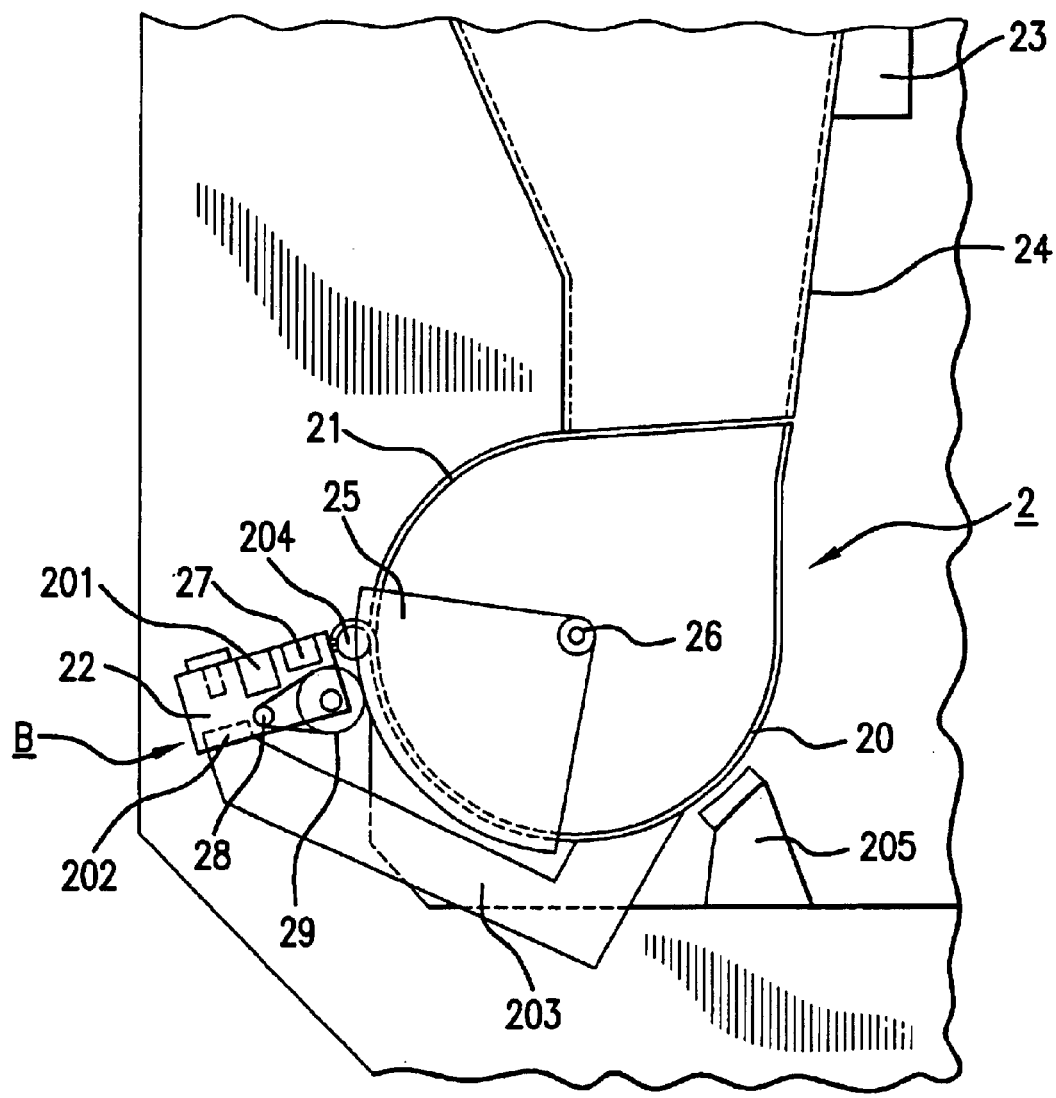
FIG. 2 is a view similar to FIG. 1 which shows a second embodiment of a feed metering device according to the invention.

The feed metering device 1 according to the embodiment of FIG. 1 may be provided with a closing means as illustrated in FIG. 2. Feed metering device 1 may additionally be provided, on a closing means, with deterring means 15 or 16 for deterring an animal that visits the feed unit at an undesired point of time and wishes to use it. The deterring means are preferably controlled with the aid of data from the animal identification device. This provides an additional manner to deter animals that are not then eligible for being fed, in a simple, efficient and inexpensive way, from putting their heads into the feed unit.

In the embodiment shown in FIG. 1, the deterring means includes a loudspeaker 16 for producing an animal-frightening sound. Alternatively or additionally, the further deterring means may include a lighting device 15 for emitting an animal-frightening light. In particular when a plurality of feed metering devices are disposed side by side, the use of a frightening light may be desirable inasmuch as this light can be directed in such a manner so its effect is limited to one particular feed metering feed device.

FIG. 2 shows schematically an embodiment of a feed metering device 2 according to the invention. In this embodiment the closing means 25 is constituted by a separate vessel-like element which is capable of rotating abut an axle 26 and is movable across entrance opening 21. When closing means 25 is moved across entrance opening 21, the contents of the feed unit 20 can be made inaccessible to a particular animal.

Additionally, there may be provided further deterring means in the form of a voltage emitting device 27 for emitting an animal-frightening electric voltage to closing means 25. Animals that undesirably approach the feed metering device 2 often contact feed metering device 2. In particular they will touch closing means 25 with their noses. By linking voltage emitting device 27 with those components of the feed metering device that are likely to be touched by the animals, it is possible locally to deter a particular animal as an additional measure. This second embodiment of a feed metering device 2 according to the invention also comprises a feed supplying device 23 and a chute 24 for the feed.

Figure 3:
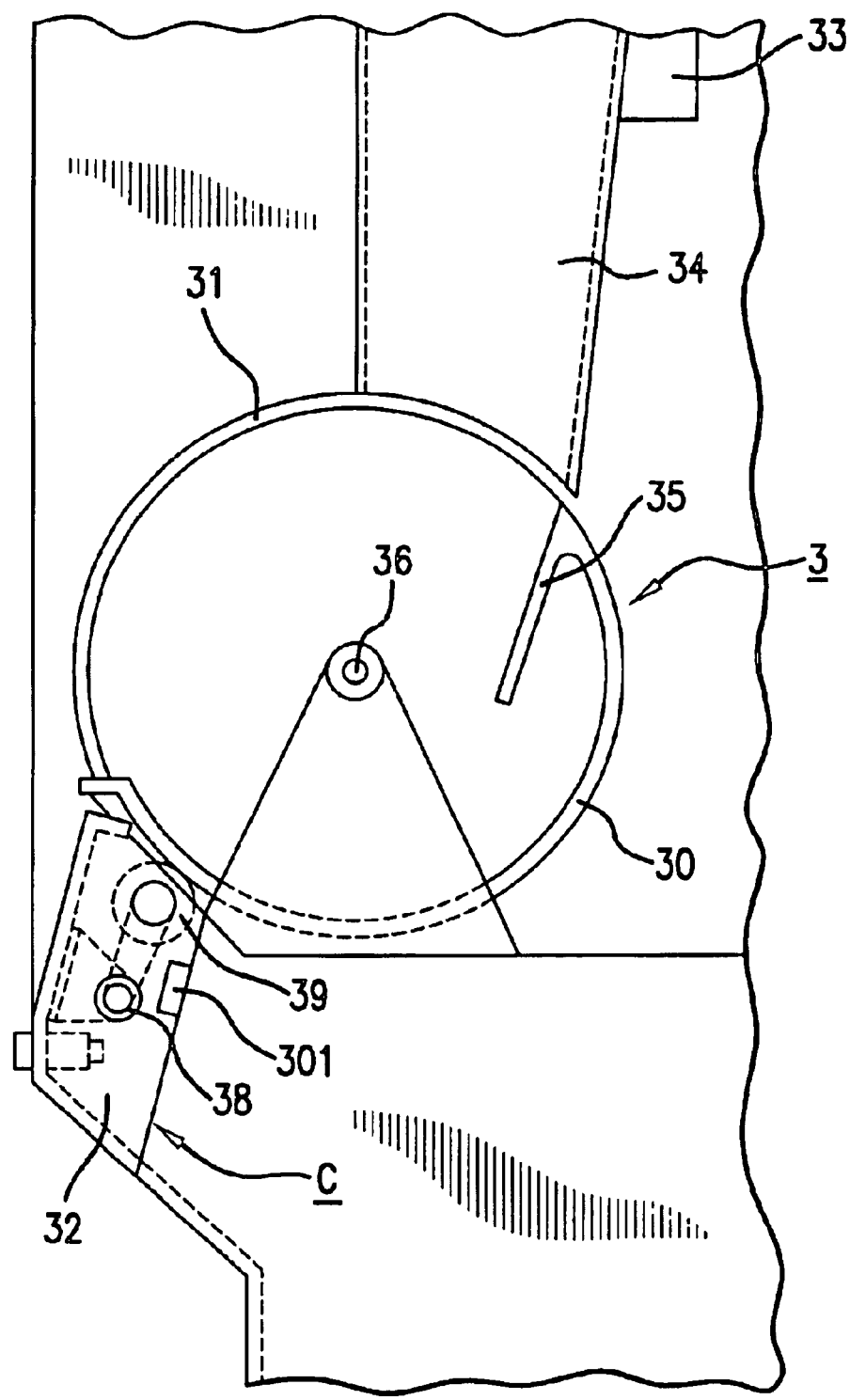
FIG. 3 is a view similar to FIGS. 1 and 2 which show a third embodiment of a feed metering device according to the invention.

FIG. 3 shows schematically a third embodiment of a feed metering device 3 according to the invention. In this embodiment the closing means is constituted by the feed unit 30 itself, which is designed to be movable. In the embodiment shown feed unit 30 is rotatably disposed about an axis 36. In order to prevent, in the positioning which the feed unit 30 closes the entrance opening 31, feed from falling from feed unit 30, feed unit 30 comprises a wall portion 35 for catching remaining feed. Said wall portion 35 can also act as a feed guide means for feed that is supplied to feed unit 30 via chute 34 of feed supplying device 33.

For the purpose of providing, a simple reliable and compact construction, according to the invention a roller 29 or 39 is driven by a motor 28 or 38, respectively which roller 29 or 39, contacts the closing means 25 or 30 respectively. Preferably feed unit 30 thus bears on the animal identification device 32 via roll 39. Roll 39 is also preferably driven by a motor such as motor 28 or motor 38.

An extremely compact construction is obtained when motor 28, motor 38 and roll 29 or roll 39, respectively, are included in a housing B or C, respectively, which is disposed below the entrance opening or in the vicinity thereof. Preferably the housing also contains the relevant animal identification devices 22 or 32, respectively.

According to the invention, the feed metering device may be provided with means for weighing the feed present in the feed unit, which means moves the feed unit in a pivoting, rotating manner. With the aid of said means it is possible to determine how much feed is consumed by a particular animal, and at the same time whether remaining feed is present in the feed unit. The means for weighing the feed present in the feed unit is preferably connected to the feed supplying device for supplying an amount of feed to the feed unit with the aid of data both from the animal identification device and the weighing means, so that the amount of feed left by the previous animal can be taken into account.

In the embodiment of FIG. 1, means for weighing the feed present in feed unit 10 comprises a feed unit 10 which is pivotable about a hinge pin 17. The degree of pivoting is determined by the weight of feed present in feed unit 10. A device 18 is provided for determining the degree of pivoting of feed unit 10 for deducing therefrom the weight of feed present in feed unit 10. Device 18 for determining the degree of gravity of feed unit 10 comprises a measuring roll 19 which is in contact with the feed unit. From the degree of rotation of roll 19 the degree of pivoting and thus the amount of feed in feed unit 10 can be determined.

Due to the fact that device 18 and roll 19 for determining the degree of pivoting of feed unit 10 are integrated in housing A, in animal identification device 12, a compact construction of the feed metering device is obtained. Alternatively, device 18 and roll 19 may be located outside housing A.

As shown in the embodiment of FIG. 2, device 201 for determining the degree of pivoting of feed unit 20 and for deducing therefrom the weight of the feed present in feed unit 20 may alternatively or additionally comprise a load sensor 202. In the embodiment shown feed unit 20 bears on load sensor 202 via a supporting arm 203, while the feed unit 20 pivots about a hinge pin 204. Load sensor 202 is preferably included in housing B.

In the embodiments shown in FIGS. 1 and 2, even small differences in weight can be measured due to the fact that the hinge pins 17 and 204 and measuring rolls 19 and 29, respectively, as well as load sensor 202, are located small distances from each other.

In order to prevent the measuring roll, the load sensor or similar component from being damaged when for example, the animal pushes the manger downwardly with force there may be provided in both embodiments safety supporting brackets 101 (FIG. 1) or 205 (FIG. 2) respectively, for supporting feed units 10 or 20, respectively.

In the embodiment of FIG. 3, the means for weighing the feed present in the feed unit comprises a movable feed unit 30. Feed unit 30 is moved in a reciprocating manner by motor 38 by which roll 39 is driven. As a result of this movement a torque occurs, the magnitude of which is determined by a device 301 for measuring torque magnitude. Device 301 deduces the weight of the feed present in the feed unit from torque as so determined. The exact correlation between torque and amount of feed can previously be determined by simple calibration tests.

The embodiment according to FIG. 3 has a compact construction due to the fact that motor 38 for moving feed unit 30 and device 301 for measuring torque magnitude during movement and for deducing, from the magnitude of the torque measured, the weight of the feed present in the feed unit 30, are integrated in housing C.

Although in addition to roll 39, a separate torque roll may be provided, roll 39 preferably functions as a drive of the closing means, in this situation constituted by feed unit 30 itself, as well as functioning as a torque roll and as a measuring roll.

Figure 4:
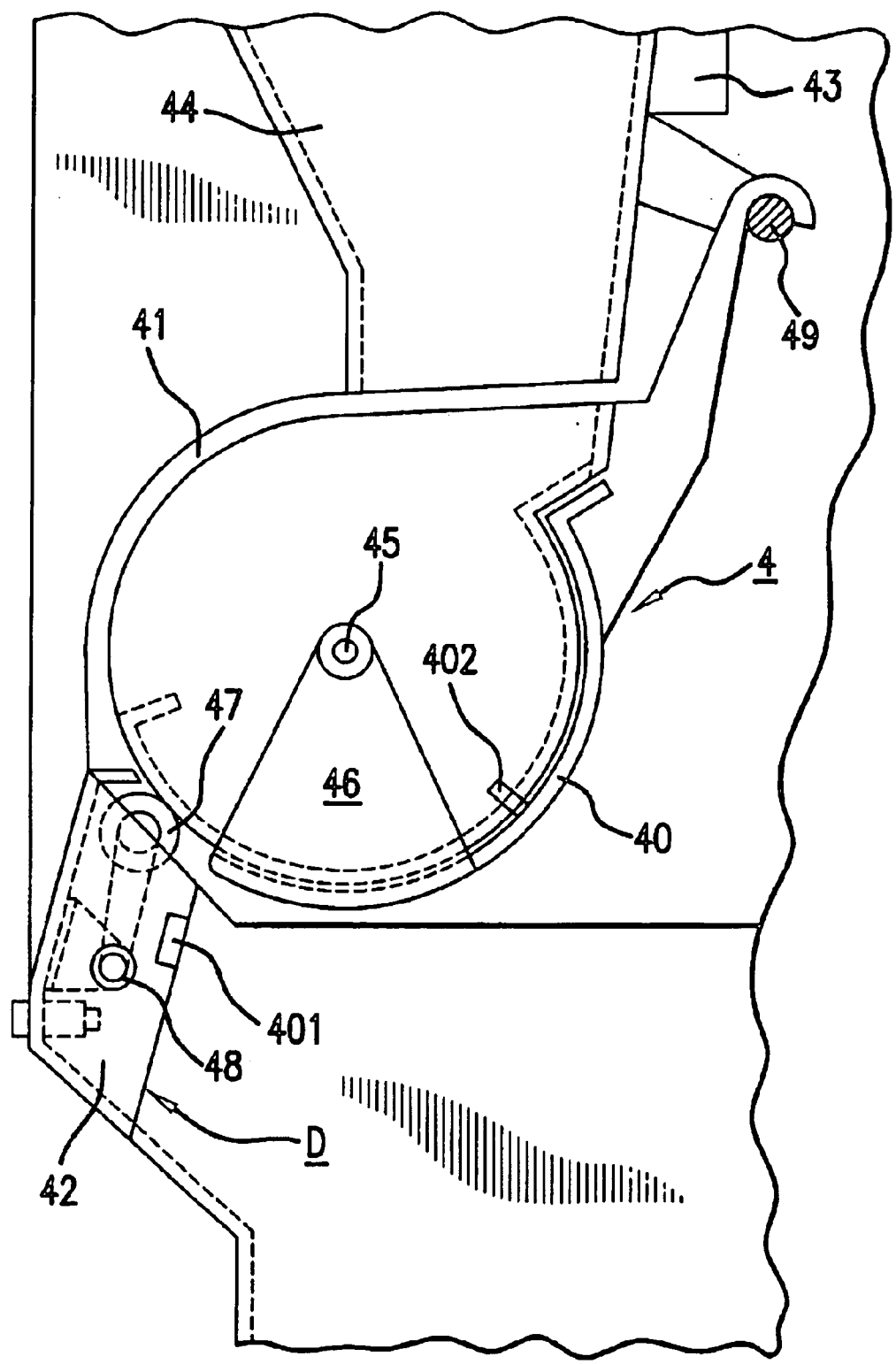
FIG. 4 is a view similar to FIGS. 1, 2 and 3 which shows a fourth embodiment of a feed metering device according to the invention.

The fourth embodiment of a feed metering device 4 according to the present embodiment, as shown in FIG. 4, comprises means for deterring an animal from using feed unit 40 before the animal is eligible to use such feed unit. This is accomplished with the aid of data from animal identification device 42, as well as means for weighing the feed present in feed unit 40.

The closing means 46, which is rotatable about an axle 45, is set in rotation by a roll 47 which can come into contact with the closing means 46. Roll 47 is driven by a motor 48 which is controlled with the aid f data from animal identification device 42.

In this embodiment the weighing means comprises feed unit 40 which is rotatable about pivot means comprising an axle 49. Feed unit 40 can be brought into contact with roll 47, and is subjected to a reciprocating motion by correctly controlling motor 48 that drives roll 47. By movement of feed unit 40 a torque is generated that can be measured by a torque measuring device 401.

In the situation shown in FIG. 4, roll 47 contacts feed unit 40 whereupon the latter is set in motion to determine the amount of feed present in feed unit 40. After an animal has consumed feed therein, the amount of remaining feed, if any, can be determined by torque measurement. Then roll 47 is controlled by motor 48 so that feed unit 40 is partially located in entrance opening 41. A catching element 402 on feed unit 40 moves closing means along with it until closing means 46 contacts roll 47. Roll 47 then controls closing means 46 so that it covers the entire entrance opening 41. As a result of the fact that feed unit 40 is no longer in contact with roll 47, feed unit 40 falls back to the starting position in which feed, if desired, can be added by the feed supplying device 43 via a chute 44.

Figure 5:
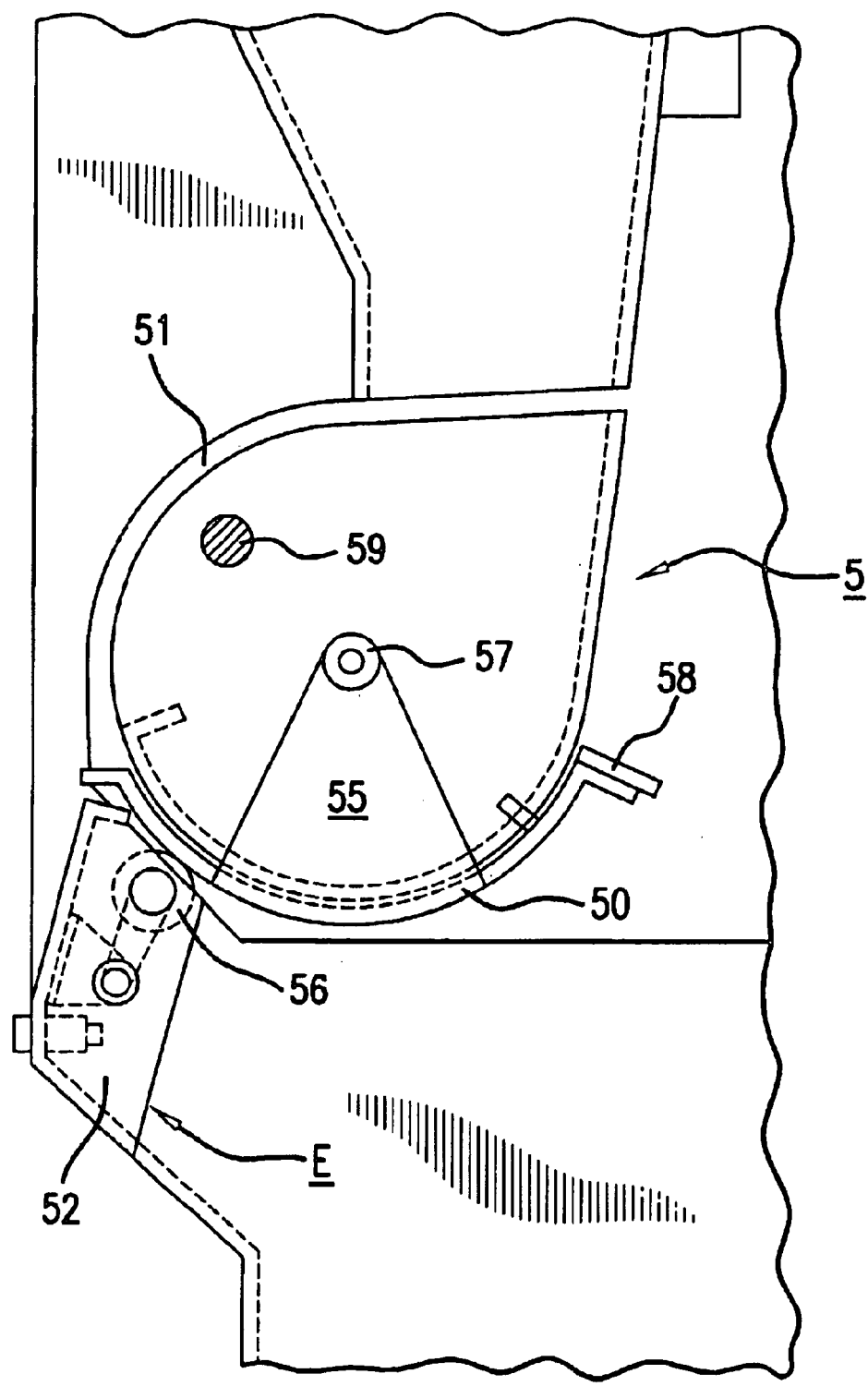
FIG. 5 is a view similar to FIGS. 1 through 4 which shows a fifth embodiment of a feed metering device according to the invention.

The fifth embodiment of a feed metering device according to the present invention, as shown in FIG. 5, differs from that of FIG. 4 by the position of the hinge pin 59 about which feed unit 50 rotates. The hinge pin 59 is positioned close to roll 56 for driving feed unit 50 and measuring the torque, for measuring very small differences in the amount of feed. There is also provided a stop 58 for preventing superfluous movement of feed unit 50. Closing means 55 for closing entrance opening 51 pivots about axle 57.

For the purpose of being able accurately to perform animal identification and to obtain at the same time a compact construction, a feed metering device according to the present invention is characterized in that the animal identification device 52 is disposed in the housing E which is located below the entrance opening or in the vicinity thereof.

Notwithstanding, that the invention has been described on the basis of an animal identification device, which may be provided with weighing means or deterring means, or both, which is stationary in the sense that it is normally fixed in position, it is also possible to dispose the animal identification device or the weighing means or the deterring means on a mobile feed unit.

Although I have disclosed the preferred embodiments of my invention, it is to be understood that it is capable of other adaptations and modifications within the scope of the following claims.

What is claimed is:

1. A feed metering device for distributing fodder or drink, or both, in metered portions to an animal, which feed metering device comprises a feed unit for containing fodder or drink, or both, an entrance opening to said feed unit, a feed supplying device for supplying an amount of fodder or drink, or both, to said feed unit, a closing means that is movable across said entrance opening in order to deter an animal visiting said feed unit from taking fodder or drink, or both, therefrom, said closing means being rotatable about an axis and driven by a roll which is provided to contact said closing means, said roll being driven by a motor, said closing means being movable about said axis so as to close said entrance opening by moving upwardly relative thereto, said feed unit having a catching element thereon which contacts and moves said closing means until said closing means contacts said roll whereupon said roll controls said closing means to cover said entrance opening entirely and said feed unit is no longer in direct contact with said roll so that said feed unit falls back into its original position for receiving fodder or drink, or both, from said feed supplying device.

2. A feed metering device in accordance with claim 1, wherein said axis is horizontal.

3. A feed metering device in accordance with claim 1, comprising weighing means.

4. A feed metering device in accordance with claim 3, which comprises a torque measuring device.

5. A feed metering device in accordance with claim 4, wherein said torque measuring device is operatively associated with said roll and said motor that drives said roll.

6. A feed metering device in accordance with claim 5, wherein said feed unit is subjected to a reciprocating motion by controlling said motion to generate a torque which is measurable by said torque measuring device.

7. A feed metering device in accordance with claim 5, wherein said weighing means is operationally associated with a pivot means about which said feed unit is rotatable.

8. A feed metering device in accordance with claim 7, wherein said feed unit is subjected to a reciprocating motion by controlling said motor to generate a torque which is measurable by said torque measuring device.

9. A feed metering device in accordance with claim 6, wherein said weighing means is operationally associated with a pivot means, said feed unit being rotatable about said pivot means.

* * * * *